United States Patent [19]

Provenzo, Jr. et al.

[11] Patent Number: 4,927,100

[45] Date of Patent: May 22, 1990

[54] AIRFOIL CONFIGURATION

[75] Inventors: Eugene F. Provenzo, Jr.; Peter A. Zorn, both of Coral Gables, Fla.

[73] Assignee: Patrician Corporation, Coral Gables, Fla.

[21] Appl. No.: 264,154

[22] Filed: Nov. 11, 1988

[51] Int. Cl.$^5$ .................. B64C 31/06; B64C 3/58
[52] U.S. Cl. .................. 244/153 R; 244/214
[58] Field of Search .................. 244/153 R, 154, 155, 244/213, 214, 35 R

[56] References Cited

U.S. PATENT DOCUMENTS

| | | | |
|---|---|---|---|
| 1,105,058 | 7/1914 | Bochau | 244/153 R |
| 2,588,293 | 3/1952 | Roe | 244/153 R |
| 3,093,354 | 6/1963 | Pohl | 244/154 |
| 3,229,938 | 1/1966 | Mularkey | 244/153 R |
| 4,243,191 | 1/1981 | Loy | 244/153 R |
| 4,377,265 | 3/1983 | Takami et al. | 244/153 R |

*Primary Examiner*—Joseph F. Peters, Jr.
*Assistant Examiner*—Rodney Corl
*Attorney, Agent, or Firm*—John H. Faro

[57] ABSTRACT

An airfoil having two (2) basic components, a sail and spoiler, associated with the leading edge of the sail, is herein disclosed. This unique airfoil design has application in flexible wing aircraft (i.e., ultralites), sport parachutes and sport kites. In the typical sport kite embodiment of this invention, there will generally be at least three (3) aerodynamic flight control surfaces: a sail, a keel, and a flexible resilient spoiler attached to the leading edge of the sail. The sail material is itself resilient, however, sufficiently rigid to maintain a preset configuration without the need for struts, spars or extrinsic physical support. A spoiler, which is located along the entire leading edge of the sail, provides additional structural reinforcement to the sail while undergoing controlled deformation in gusty or high winds. The effect of such deformation of the spoiler causes the sail to stall before any physical damage can occur. The resiliency of the spoiler immediately, thereafter, returns the sail to pre-stall configuration, and flight is thereupon resumed without physical damage to the kite. Under certain conditions, it may be desirable to further enhance the inherent physical strength of the sail along the centerline of the sail coincident with the area of the stress imparted upon the sail by the keel. This is readily accomplished by affixing an additional section of sail construction material, or its equivalent, along the topside surface of the sail, opposite to and coincident with the placement of the keel.

5 Claims, 2 Drawing Sheets

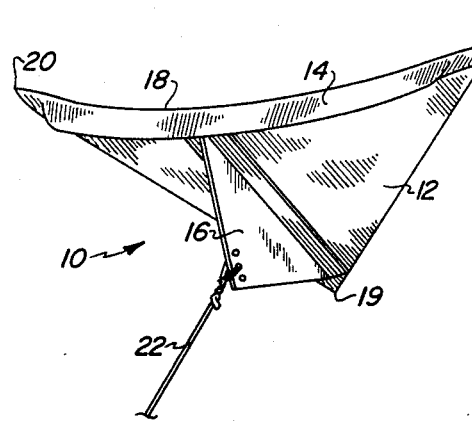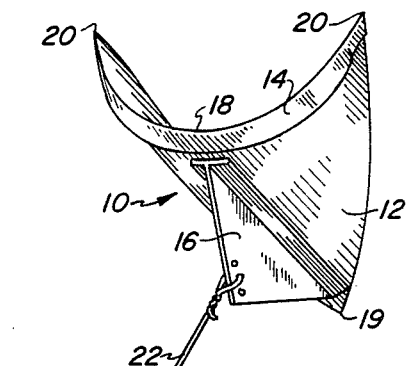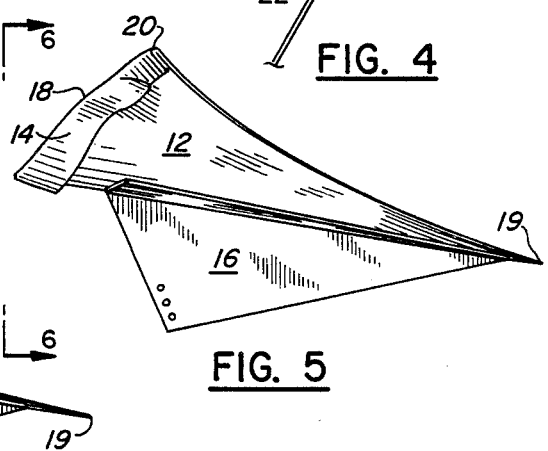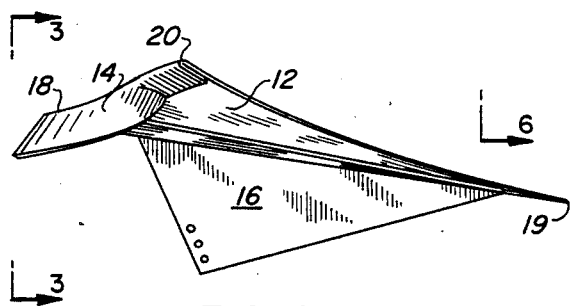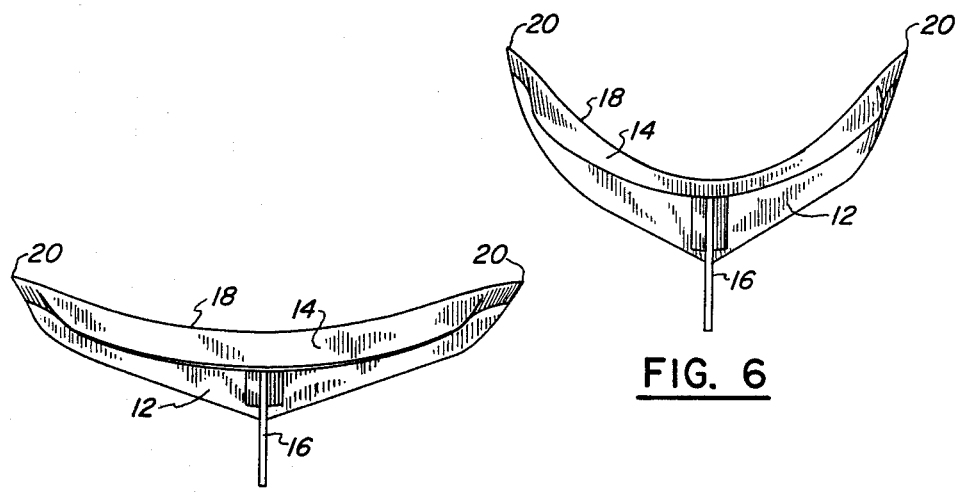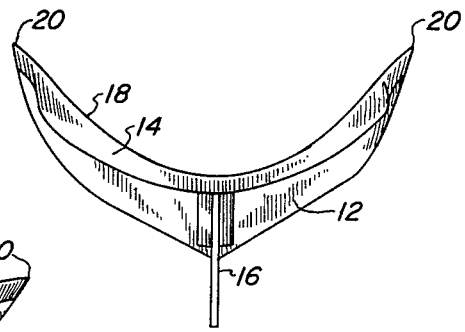

AIRFOIL CONFIGURATION

BACKGROUND OF THE INVENTION

1. Field of the Invention

This invention relates to a device and to a method. More specifically, this invention is directed to a self-supporting flexible airfoil which isresistant to possible damage by relatively strong or gusty winds. This invention further provides a method for reinforcement of an airfoil by simple and efficient means without increasing the weight thereof.

2. Description of the Prior Art

The design of an airfoil involves certain aerodynamic principles which govern its lift, flight and stall characteristics. The airfoil can either be relatively inflexible, such as in the case as a fixed wing aircraft, or relatively flexible, as in the case of the design of certain kites. In each configuration, the lift on the airfoil is created by an air pressure differential created by the relative wind as it flows over the top and underside of the airfoil. This differential can be altered and the airfoil stalled where the angle of attack of the airfoil is increased beyond permissible limits. A second technique for reducing the lift on an airfoil is to alter the shape of the airfoil itself. In a typical aircraft wing, a spoiler can be deployed, much in the same way as flaps, and thus increase the rate of descent of an aircraft (without otherwise altering the angle of attack or air speed of the aircraft). The spoiler is typically activated prior to landing.

In the design and manufacture of flexible airfoils, a number of alternative configurations have been suggested. Each such alternative generally has one or more inherent limitations either with respect to its structural integrity and/or ability to accommodate strong and/or gusty winds. The prior art relating to kite construction is representative of such flexible airfoil construction and is, thus, discussed hereinafter in some detail.

With respect to such kites, there are basically two (2) types of configuration disclosed in the prior art; namely, the more traditional structure incorporating struts or some form of stiffening member and those kites in which the structural integrity and shape of the airfoil is maintained by the inherent stiffness or rigidity of the construction materials themselves. The following list of patents is representative of each type of construction: U.S. Pat. No. 3,752,423 (to Schaeffer); U.S. Pat. No. 4,103,850 (to Bushell); U.S. Pat. No. 2,820,320 (to Levicy); U.S. Pat. No. 4,216,929 (to Holland); U.S. Pat. No. 4,354,647 (to Carpenter); U.S. Pat. No. 3,697,023 (to Jackson); and U.S. Pat. No. 3,507,464 (to Rogallo).

U.S. Pat. No. 3,752,423 (to Schaeffer) describes a simple and inexpensive technique for forming a kite from one (1), or preferably two (2), rectangular sheets of pliable and relatively stiff paper or plastic construction materials. The Schaeffer kite is formed by simply folding a rectangular sheet of construction materials along the centerline, which is to later define the location of the keel of such kite. Each of the two (2) lateral symmetrical panels to either side of the centerline are now curved, or rolled downward, and fastened to the keel to form a pair of what the inventor characterizes as "wings". The forward corner of the leading edge of each of these wings are fastened to the keel with a staple or other conventional fastening means. The resultant product is reported capable of flight in light to moderate breezes and does not, due to its construction and center of gravity, require a tail. The absence of an struts, spars or other traditional form of stiffening member apparently constrains the use of the Schaeffer kite to relatively gentle wind conditions.

U.S. Pat. No. 4,103,850 (to Bushell) describes the fabrication of a kite from two (2) substantially triangular panels joined together along a first seam, which forms the base of a keel. These triangular panels are also joined together along a second seam (which is parallel to and above the first seam) thereby forming what the inventor characterizes as a "double keel". A stiffening member, or mast, is disposed longitudinally in the lower edge of the keel and thereby maintains the dimensional stability of the keel's shape. The leading edges of each triangular panel are also reinforced, or stiffened, with a spar and a cross member attached to each spar member at right angles to the mast. The foregoing design reportedly improves flight stability in high winds.

U.S. Pat. No. 2,820,320 (to Levicy) describes the fabrication of a gliding or miniature kite from construction materials and stay strips (integral framing members). These stays reinforce and maintain the shape of the kite and can be bent, as desired, to permit selective adjustments of the wing and tail configuration portions of the kite. This kite design is adapted for use with a short tether which is attached to a stick.

U.S. Pat. No. 4,216,929 (to Holland) describes what appears to be an improvement in the Bushell design (U.S. Pat. No. 4,103,850—previously discussed herein). The Holland design enhances the stability of the Bushell kite in relatively strong winds by providing a light weight, dimensionally rigid, reinforcing spar along the entire leading edge of the kite sail. Similar structural rigidity is added to the base of the keel. The differences between the Holland and the Bushell designed are illustrated in their patents at FIGS. 10 and 3, respectively.

U.S. Pat. No. 4,354,647 (to Carpenter) describes a method of fabricating a miniature kite which can be readily assembled and disassembled for ease of storage. Carpenter reinforces the wing section of his kite by providing a "U-shaped" slit (reference numeral 16) in the wing of the kite. When the portion of the wing section defined by slit (16) is folded up, it forms a brace or reinforcing rib (reference numeral 17) which reportedly lends dimensional rigidity to the wing section.

U.S. Pat. No. 3,697,023 (to Jackson) describes the fabrication of the wing control kite having one or more tabs arranged along the outer regions of the leading edge of the kite sail. These tabs, which are disposed in a vertical attitude during flight, prevent the lateral portions of the wings from collapse during rapid wind shift or slight yaw of the kite. Battens are provided to stiffen these tabs relative to the leading edge so as to maintain their configuration during flight. In the preferred flight configuration, these tabs are maintained at an angle to the wing of between fourteen degrees (14°) to sixteen degrees (16°).

U.S. Pat. No. 3,507,464 (to Rogallo) describes a method for fabrication of a flexible wing having reinforcement in the trailing edge of such wing. The relative position of such reinforcing members can be altered and the wing configuration thereby changed. Rogallo indicates that by altering these reinforcing members, increase control of the flexible wings is obtained by "spoiling" the aerodynamic flow over the wing membrane.

As is evident from the foregoing description of the representative prior art, simplicity of airfoil construction is not without sacrifice in flight stability and durability of the resultant structure. Where such reinforcement is added, the additional weight is not without penalty. As discussed in the Holland patent, the addition of reinforcement generally increases the mass of the control surfaces with a reported corresponding improvement in performance in gusty or relatively strong winds. Holland addresses this problem of flight stability by adding structural rigidity to the leading edge of the sail portion of the airfoil. By way of contrast, the Rogallo patent addresses the problem of airfoil stability by modification of the trailing edge of the air flow. In each instance, such improved stability in strong and gusty winds has required the addition of spars, or the equivalent, to the sail portion of the kite. Not only does such reinforcement increase the weight but also the cost of its manufacture. As is thus evident, there exists a continuing need for improvement in kite design wherein the aerodynamic performance of the sail portion of the kite is maintained, stability enhanced, and yet the structural integrity preserved in both gusty and relatively strong winds.

OBJECTS OF THE INVENTION

It is, thus, the object of this invention to remedy the above as well as related deficiencies in the prior art.

More specifically, it is the principal object of this invention to provide a flexible airfoil of simplified construction wherein the flight configuration of the primary lift producing surface (hereinafter "sail") can change to accommodate increasingly strong winds.

Another object of this invention is to provide a means and a method for modification of the flight configuration of the sail portion of the airfoil to enable the stalling of such airfoil in strong or gusty winds prior to exceeding the structural limits of such airfoil.

Still another object of this invention is to provide a flexible spoiler along the entire leading edge of the sail of the airfoil, the spoiler lending support and resistance to change in the airfoil flight configuration.

Still yet another object of this invention is to provide a kite incorporating the flexible airfoil configuration of this invention.

An additional object of this invention includes the adaptation of the flexible airfoil configuration of this invention to small, light weight kites which are essentially devoid of structural reinforcement.

SUMMARY OF THE INVENTION

The above and related objects are achieved by providing an airfoil of resilient yet defined structural integrity wherein the construction materials of the airfoil have sufficient, inherent rigidity to maintain the airfoil in a self-supporting, pre-defined flight configuration. In the preferred embodiments of this invention, the airfoil has multiple aerodynamic control surfaces; a sail, a spoiler integrated into the leading edge of the sail and a keel (optional). The sail portion of the airfoil is essentially symmetrical in configuration along a plane coincident with the placement of the keel (hereinafter "centerline"). The leading edge of the sail is preferably in the form of a convex arc, with the most forward point thereof at the centerline of the sail. The leading edge of the sail is formed by scoring the upper surface of the sail at a prescribed uniform distance from the border of the construction materials. The airfoil is, thereafter, folded along the score line and the outer most extremities of the fold affixed to the underside of the sail thereby forming a spoiler along the leading edge thereof. The spoiler is resilient, to a degree, much in the same way as the major surface of the sail. The spoiler performs two (2) functions in this configuration, the first of which being to provide a degree of structural reinforcement to the sail in relatively strong and gusty winds. The second function is to provide a means for dynamically altering the aerodynamic configuration of the airfoil in the sail and thereby induce a stall, before any structural damage to the sail can occur. The resilient nature of the spoiler immediately thereafter returns the sail to its aerodynamic configuration and flight is thus immediately resumed.

In one of the preferred embodiments of this invention, an additional thickness of construction material, or its equivalent, can be permanently affixed to the sail surface essentially coincident with, and opposite to, the surface of the sail attached to the keel. This additional thickness of construction material covers at least about ten (10) up to about twenty-five percent (25%) of the surface area of the sail. Its primary function is twofold: (a) to lend additional physical strength to the sail along the axis of greatest stress; and (b) to provide increase structural integrity to the sail's pre-defined flight configuration.

BRIEF DESCRIPTION OF THE DRAWINGS

FIG. 1 is a perspective view from below of the airfoil of this invention, having a relatively shallow dihedral angle.

FIG. 2 is a side view of the airfoil of FIG. 1.

FIG. 3 is a frontal view of the airfoil of FIG. 1.

FIG. 4 is a perspective view, from below, of the airfoil of this invention having a relatively severe dihedral angle.

FIG. 5 is a side view of the airfoil of FIG. 4.

FIG. 6 is a frontal view of the airfoil of FIG. 4.

DETAILED DESCRIPTION OF THE INVENTION INCLUDING THE PREFERRED EMBODIMENTS

Figure 7:
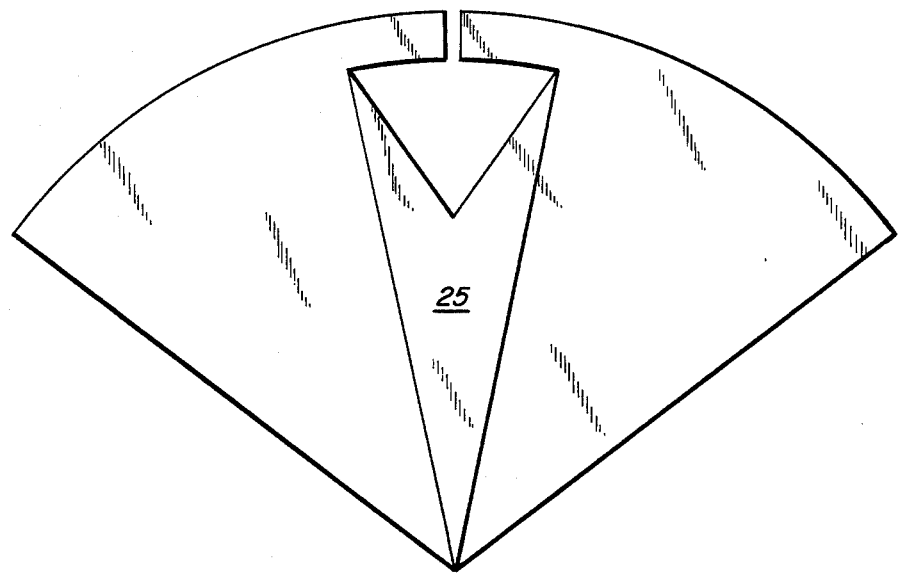
FIG. 7 is a plan view of delta wing style of sail having an additional thickness of construction material affixed to the topside surface of the sail.
Figure 8:
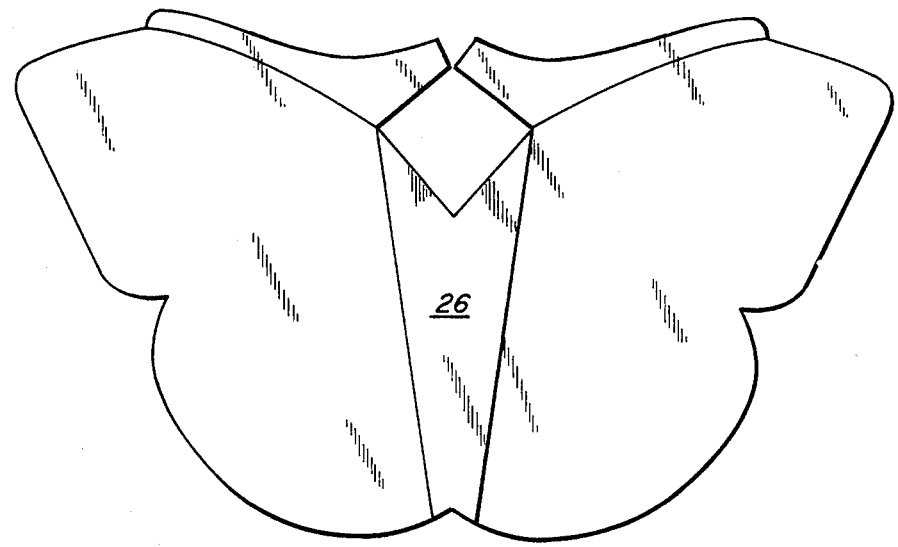
FIG. 8 is a plan view of a butterfly style of sail having an additional thickness of construction material affixed to the topside surface of the soil.

The concepts of this invention are hereinafter described in references to FIGS. 1–8. Where one or more of the elements of the airfoils illustrated therein are common to each of these figures, they are assigned a common reference numeral for easy explanation and identification.

FIGS. 1 and 4 illustrate the extremes of the flight configuration of a kite incorporating the unique airfoil of this invention. The basic structure of the kite (10) shown in such figures include a sail (12), a spoiler (14) and a keel (16). The sail (12) is basically symmetrical along a plane coincident with the placement of the keel. This plane of symmetry (also, hereafter referred to as the "centerline") is also the reference point from which the angle of inclination, referred to as the "dihedral" angle of airfoil, can be determined.

FIG. 1 illustrates the the airfoil configuration of this invention in normal flight configuration of the kite in relatively light winds. When the kite is viewed in perspective and from below, the airfoil has only a relatively slight arched (shallowed dihedral angle) sail. As is evident from FIG. 1, the sail portion of the airfoil is essentially devoid of spars, struts and other extrinsic reinforcement, thereby preserving its light weight and efficient method of manufacture. The airfoil is also a substantially symmetrical structure, its plane of symmetry running from the leading to the trailing edge (18), along a line equidistant from the tapered "wing" tips (20) of the sail. The preferred sail configuration, which is illustrated in FIG. 1, is an essentially triangular planar member having an arcuate leading edge. The arcuate leading edge is modified, as shown, by provisions of a spoiler. This spoiler, in the embodiments of this invention illustrated in FIG. 1, is integral to the sail and formed by initially scoring the surface of the sail, disposed opposite the keel, and thereafter folding the sail downward along the score line to form the spoiler. The outermost tips (corners) of the spoiler are thereafter permanently affixed or anchored to the underside of the sail. The spoiler (14), in the normal configuration, as shown in FIG. 2, extends beyond the leading edge of the sail (18) and lends structural rigidity to the sail's normal aerodynamic configuration. In relatively strong or gusty winds, the spoiler will flex along with the sail, as shown in FIGS. 4–6. Between the extremes of FIGS. 3 and 6, the dihedral angle of the sail will change gradually in response to changes in air pressure on the underside of the sail. As the air pressure on the underside of the sail increases, the dihedral angle will increase, and as the wind subsides, the dihedral angle will return the sail to its "normal" configuration.

The airfoil of this invention accommodates such variation in wind conditions by changing the aerodynamic configuration of the sail to avoid structural damage while maintaining stable flight configuration. Before the wind conditions exceed the structural limits of the airfoil, the change in aerodynamic configuration of the spoiler will cause the sail to stall, thereby relieving the stresses upon its structural components (sail and keel). The stall is, however, very abbreviated and upon release of the positive air pressure from the underside of the sail, the spoiler and the resilient nature of the airfoil construction materials will return the sail to its normal (pre-set) configuration.

The keel placement is along a plane of symmetry (centerline) with runs from the leading to the trailing edge (19) of the kite. The keel illustrated in the kite, shown in FIG. 1, is also relatively flexible, being essentially devoid of the struts or other types of traditional reinforcements. The shape and placement of the keel, its point of attachment to the sail and the location of the tethering line (22) to the keel, can affect the relative stability of the kite and the effect thereof on the aerodynamic forces, which operate upon the kite during flight. It is, thus, preferable to configure the keel, with respect to its own shape and point of attachment to the sail, to provide a relatively rearward center of gravity, thereby reducing the need for a tail (not shown) or other comparable stabilizing means. The basic design of the kite configuration of this invention can include additional flight stabilizing enhancements (i.e., a tail) to further accommodate variations in sail design.

The structural material of the airfoil of this invention has sufficient physical integrity and stiffness to be self-supporting and formed into predetermined shapes. For example, the preferred construction materials of the airfoil of this invention are plastics or synthetic paper. The preferred light weight construction material of the airfoil of this invention is KENDURA TM brand plastic paper. In the preferred kite configurations of this invention, the dimensions of the sail, expressed in relative terms of wingspan to the length of the chord at the centerline of the sail, can range from about 5:4 to about 1:1, depending upon the kite design. For example, in the typical delta wing style of airfoil, shown in FIG. 7, the sail proportions will preferably be about 5:4 (wingspan:chord); in contrast to the typical butterfly style of airfoil, shown in FIG. 8, wherein the wingspan and chord proportions of the sail are approximately 1:1. Under certain conditions, it may be desirable to further enhance the inherent physical strength of the sail. One technique for achieving such enhancement is by affixing an addition section of construction material (reference numerals 25 and 26 of FIGS. 7 and 8), or its functional equivalent, on the topside surface of the sail, opposite to and coincident with the area of stress imparted to the sail by the keel.

Where this invention is to be used in an aircraft or glider wing, the construction materials can consist of the graphite and glass fiber filled plastic composites. In the preferred embodiments of this invention, both the sail and the spoiler are fabricated from the same construction material and from the same piece of construction stock. This manufacturing technique is obviously preferred, however, not necessarily required for attaining a comparably fabricated airfoil. More specifically, the sail and the spoiler of the airfoil can be separately fabricated and simply assembled at a later time in the preferred configuration of the airfoil of this invention. It is, however, essential to the effective interaction of these two components, that each of these functional components be allowed to articulate relative to one another at the leading edge of the sail and that each have a relative degree of resiliency consistent with the maintenance of the structural integrity of the resultant assembly. It may, under the appropriate circumstances, be advantageous to fabricate the sail and the spoiler from different materials of different densities so as to control the relative center of gravity of the resultant composite. Notwithstanding such variations and refinements, the basic aerodynamic design and functional characteristics will remain the same; namely, the controlled resistance to change in dihedral angle of the sail and the inducement of a stall prior to exceeding the structural limits of the airfoil.

The aerodynamic forces and the design constraints required to accommodate such forces are described in detail in previously referenced U.S. Pat. No. 4,216,929 (hereby incorporated by reference in its entirety). The "conventional" wisdom in airfoil and kite design (as typified by the '929 patent) for accommodating strong and gusty winds, is to simply add or increase the structural rigidity of the airfoil to resist such stresses. This conventional approach does not obviously lend itself to this fabrication of an airfoil without reinforcing spars or struts, all of which increase cost, weight and minimum wind velocity necessary to generate lift. The present invention avoids such "conventional" approaches, while maintaining the aerodynamic configuration of its airfoil over a broad range of wind conditions.

Further advantages of this invention will become apparent as the airfoil configuration is adapted to accommodate applications in the specific environments of aircraft glider design, ultralite aircraft design and in sport parachute design.

What is claimed is:

1. An airfoil comprising:

(a) a sail having an essentially symmetrical planar configuration, said sail comprising an arcuate leading edge, a trailing edge and a tapered profile from the outermost lateral tips of its leading edge to the outermost lateral tips of its trailing edge; and
(b) a spoiler integral with and in articulating relationship to said sail along essentially the entire leading edge of said sail, said spoiler extending forward and downward from said leading edge and affixed at the lateral tips thereof to the underside of the sail;
the inherent physical characteristic of the construction materials of each of said sail and said spoiler being sufficiently stiff to maintain each such airfoil component at a normal or pre-set aerodynamic configuration having a shallow dihedral angle and yet sufficiently resilient to permit controlled resistance to change in said dihedral angle of said sail in response to changing wind conditions.

2. The airfoil of claim 1, wherein the change in dihedral angle can cause modification of the aerodynamic configuration of both the sail and spoiler sufficient to cause the airfoil to stall.

3. The airfoil of claim 1, wherein the sail component is in the style of a delta wing.

4. The airfoil of claim 1, wherein the sail component is in the style of a butterfly.

5. The airfoil of claim 1, including an additional control surface in the shape of a keel, said keel affixed to the underside of the sail component thereof along a line coincident with the plane of symmetry running from the leading edge and equidistant from the wing tips of the sail.

* * * * *